United States Patent
Naganuma et al.

(10) Patent No.: US 8,891,033 B2
(45) Date of Patent: Nov. 18, 2014

(54) DISPLAY DEVICE

(71) Applicant: Japan Display Inc., Tokyo (JP)

(72) Inventors: Tomohiko Naganuma, Mobara (JP); Shinichiro Oka, Hitachi (JP); Tatsuya Sugita, Takahagi (JP)

(73) Assignee: Japan Display Inc., Tokyo (JP)

( * ) Notice: Subject to any disclaimer, the term of this patent is extended or adjusted under 35 U.S.C. 154(b) by 95 days.

(21) Appl. No.: 13/769,660

(22) Filed: Feb. 18, 2013

(65) Prior Publication Data

US 2013/0215373 A1   Aug. 22, 2013

(30) Foreign Application Priority Data

Feb. 21, 2012   (JP) .................. 2012-035310

(51) Int. Cl.
| | |
|---|---|
| *G02F 1/1335* | (2006.01) |
| *H04N 13/04* | (2006.01) |
| *H04N 13/00* | (2006.01) |
| *G02F 1/1339* | (2006.01) |
| *G02B 27/22* | (2006.01) |

(52) U.S. Cl.
CPC .......... *G02F 1/1339* (2013.01); *H04N 13/0452* (2013.01); *H04N 13/00* (2013.01); *H04N 13/0404* (2013.01); *G02B 27/2214* (2013.01); *H04N 2213/001* (2013.01)
USPC ............................................. 349/15; 349/141

(58) Field of Classification Search
USPC ..................................................... 349/15, 141
See application file for complete search history.

(56) References Cited

FOREIGN PATENT DOCUMENTS

| | | |
|---|---|---|
| JP | 2000-131700 A | 5/2000 |
| JP | 2009-520231 A | 5/2009 |
| WO | 2007/072289 A2 | 6/2007 |

*Primary Examiner* — Phu Vu
(74) *Attorney, Agent, or Firm* — Ulmer & Berne LLP (57) ABSTRACT

In a three-dimensional display device using a liquid crystal lens, a planer electrode is formed on an upper substrate of the liquid crystal lens and strip-like electrodes are formed on a lower substrate of the liquid crystal display lens. The distance between the upper and lower substrates is provided by a bead. At this time, if the bead is present on the strip-like electrode, the lens formed thereon is distorted. In order to prevent this, a bump is formed to cover the strip-like electrode. The distance between the bump and the upper substrate is small, so that the bead is pushed out of the upper part of the strip-like electrode, preventing the lens from being distorted. As a result, it is possible to prevent the crosstalk caused by the lens distortion due to the presence of the bead on the strip-like electrode.

16 Claims, 11 Drawing Sheets

DISPLAY DEVICE

CLAIM OF PRIORITY

The present application claims priority from Japanese Patent Application JP 2012-035310 filed on Feb. 21, 2012, the content of which is hereby incorporated by reference into this application.

FIELD OF THE INVENTION

The present invention relates to a display device, and more particularly, to a three-dimensional display device in which a liquid crystal lens with the lens function is provided on the display surface side of a liquid crystal display panel.

BACKGROUND OF THE INVENTION

For example, in order to switch between two dimensional (2D) display and three-dimensional (3D) display by the naked eye without using glasses or other vision equipment, there is a device including a first liquid crystal display panel for performing image display, and a second liquid crystal display panel provided on the display surface side (observer side) of the first liquid crystal display panel. The second liquid crystal display panel forms a parallax barrier to allow a different light beam to be incident on each of the left and right eyes of an observer in a 3D display. In such a liquid crystal display device, it is possible to switch between 2D display and 3D display by controlling the orientation of the liquid crystal molecules of the second liquid crystal display panel, changing the refractive index in the second liquid crystal display panel, forming lens (lenticular lens, cylindrical lens array) areas extending in the vertical direction of the display surface and aligned in the horizontal direction, and directing the light of pixels corresponding to the left and right eyes to the observing point of the observer.

As an example of the three-dimensional display device of the liquid crystal lens system with such a configuration, there is an automatic stereoscopic display device described in Published Japanese Translation of a PCT Application No. 2009-520231. In the display device described in Published Japanese Translation of a PCT Application No. 2009-520231, a planar electrode is formed on one of two transparent substrates facing each other with a liquid crystal layer in between. At the same time, strip-like electrodes (linear electrodes) extending in the formation direction of the lens are aligned on the other transparent substrate. With this configuration, it is possible to control the switching between 2D display and 3D display, by controlling the refractive index of the liquid crystal molecules by the control of the voltage to be applied to the strip-like electrode and by the control of the voltage to be applied to the planar electrode. Further, although there is no explicit description in Published Japanese Translation of a PCT Application No. 2009-520231, beads or other materials are supposed to be used for spacers to keep the thickness of the liquid crystal layer.

In the electrode structure with the configuration described above, a bead SB may be fixed on the top of the strip-like electrode when the two transparent substrates are bonded. In this state, the liquid crystal orientation is disturbed in the vicinity of the strip-like electrode by the bead, resulting in a problem of occurrence of unwanted light. The occurrence of unwanted light may degrade the crosstalk that represents the 3D display image quality.

Japanese Unexamined Patent Application Publication No. 2000-131700 describes a configuration in which the orientation control capability of the oriented film surface is uniformed, by controlling the concave-convex shape of the oriented film surface in a liquid crystal display panel so that the average inclination angle is 8.5 degrees or less, or so that the shape is tapered forward with an aspect ratio (vertical/horizontal ratio) of 0.15 or less. In this way, it is possible to reduce the occurrence of display failure due to the change in the initial orientation direction.

SUMMARY OF THE INVENTION

Japanese Unexamined Patent Application Publication No. 2000-131700, the uniformity in the rubbing process in the oriented film surface is improved by the control of the concave convex shape of the oriented film in the liquid crystal display panel. However, Japanese Unexamined Patent Application Publication No. 2000-131700 describes the configuration of a general liquid crystal display panel, and there is no description of the problem in the liquid crystal lens. It is an object of the present invention to provide a structure of a liquid crystal lens in which the distance between a first transparent substrate and a second transparent substrate is provided by a bead SB, preventing the degradation of the 3D image display characteristics due to the distortion of the liquid crystal lens, which is caused by the presence of the bead SB on an electrode for forming the liquid crystal lens.

The present invention solves the above problems by providing the following:

(1) There is provided a display device in which a liquid crystal lens is provided on a display panel. The liquid crystal lens includes a first transparent substrate and a second transparent substrate with liquid crystal in between. The distance between the first and second transparent substrates is provided by a bead. The first transparent substrate includes a planar electrode. The second transparent substrate includes strip-like electrodes extending in a first direction and aligned in a second direction orthogonal to the first direction. The strip-like electrode is covered by a bump extending in the first direction. With this configuration, the display device provides a three-dimensional display by applying a voltage between the planar electrode and the strip-like electrode, and provides a two-dimensional display by not applying a voltage between the planar electrode and the strip-like electrode.

(2) In the display device described in paragraph (1), the ratio between the vertical diameter and the transverse diameter in the cross section in the second direction of the bump is 0.26 or more and 1.0 or less. The vertical diameter is the highest diameter of the particular cross section. The transverse diameter is the widest diameter of the particular cross section.

(3) In the display device described in paragraph (2), the ratio between the vertical diameter and the transverse diameter in the bump is 0.35 or more and 1.0 or less.

(4) In the display device described in paragraph (2), the angle of a plurality of sides facing the first substrate in the shape of the cross section of the bump is convex with respect to the first substrate.

(5) The display device described in paragraph (2), the side facing the first substrate in the shape of the cross section of the bump is parallel to the first substrate.

(6) The display device described in paragraph (2), the shape of the cross section of the bump is a rectangle.

(7) The display device described in paragraph (2), the shape of the cross section of the bump is an oval.

(8) The display device described in paragraph (1), the width in the second direction of the strip-like electrode is 0.15 to 0.5 times the thickness of the liquid crystal layer.

(9) The display device described in paragraph (1), the height in the second direction of the bump is 0.6 to 1.0 times the thickness of the liquid crystal layer.

(10) There is provided a display device in which a liquid crystal lens is provided on a display panel. The liquid crystal lens includes a first transparent substrate and a second transparent substrate with liquid crystal in between. The distance between the first and second transparent substrates is provided by a bead. The first transparent substrate includes a planar electrode. The second transparent substrate includes strip-like electrodes extending in a first direction and aligned in a second direction orthogonal to the first direction. The strip-like electrode is covered by a bump extending in the first direction. The bump is formed so that the distance between the bead and the strip-like electrode is greater than the thickness of the liquid crystal layer.

(11) In the display device described in paragraph (1) or (10), the dielectric anisotropy of the liquid crystal material used for the liquid crystal layer is positive.

(12) In the display device described in paragraph (1) or (10), the bump is formed from a resin.

(13) In the display device described in any of paragraphs (1) to (10), the display panel is a liquid crystal display panel.

According to the present invention, the liquid crystal lens includes the structure that allows the bead SB to be moved away from the upper part of the strip-like electrode, to prevent the liquid crystal lens from being degraded. In this way, the crosstalk can be prevented from being degraded. As a result, high quality 3D image display can be achieved in the liquid crystal lens system.

DETAILED DESCRIPTION OF THE PREFERRED EMBODIMENTS

Hereinafter, the present invention will be described in detail with reference to embodiments. Note that components having the same function are denoted by the same reference symbols throughout the drawings for describing the embodiments, and the repetitive description thereof will be omitted.

First Embodiment

General Configuration

Figure 1:
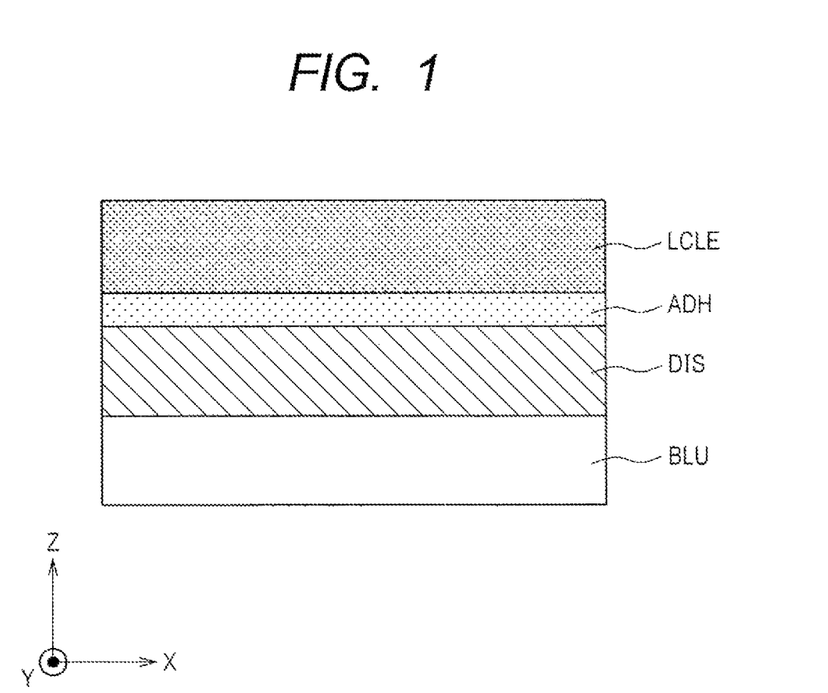
FIG. 1 is a cross-sectional view of the general configuration of a display device according to a first embodiment of the present invention.

The general configuration of a first embodiment will be described with reference to FIGS. 1 to 8. FIG. 1 is a cross-sectional view of a display device according to the first embodiment. As shown in FIG. 1, in the display device according to the first embodiment, a backlight unit BLU is formed on the bottom layer of the display device. Further, a liquid crystal display panel DIS and an adhesion layer ADH are stacked in this order on the backlight unit BLU. Then, a liquid crystal lens CLE is formed on the top layer of the display device.

The liquid crystal display panel DIS is, for example, an in-plane switching (IPS) liquid crystal display device. However, other types of display panels such as a non-light emitting display panel and a light-emitting display panel such as an organic EL display panel can also be used. If such display panels are used instead of the liquid crystal display panel, it is necessary to provide a polarization plate between the display panel and the liquid crystal lens LCLE. This is because the liquid crystal lens can only control polarized light. If the light-emitting display panel is used, the backlight unit BLU would not be necessarily required. In the following description, it is assumed that the display panel is a liquid crystal display panel. Further, it is also assumed that the liquid crystal display panel is an IPS liquid crystal display device.

The adhesion layer ADH fixes the liquid crystal display panel DIS and the liquid crystal lens LCLE together. The adhesion layer ADH is formed by a known resin member and the like. The liquid crystal lens LCLE focuses the polarized light passing through the adhesion layer ADH when the driving voltage is applied. The liquid crystal lens LCLE, unlike a loupe and the like, does not focus light by the distribution of the shape. The liquid crystal lens LCLE is a gradient index (GRIN) lens that focuses light by the distribution of the refractive index. When the driving voltage is not applied to the liquid crystal lens LCLE, the liquid crystal lens LCLE allows the polarized light passing through the adhesion layer ADH to pass through, with no influence on the light. At this time, the image viewed by the observer is displayed in 2D. On the other hand, when the driving voltage is applied to the liquid crystal lens LCLE, the liquid crystal lens LCLE focuses the polarized light passing through the adhesion layer ADH on the focal point. At this time, the image viewed by the observer is displayed in 3D.

Figure 2:
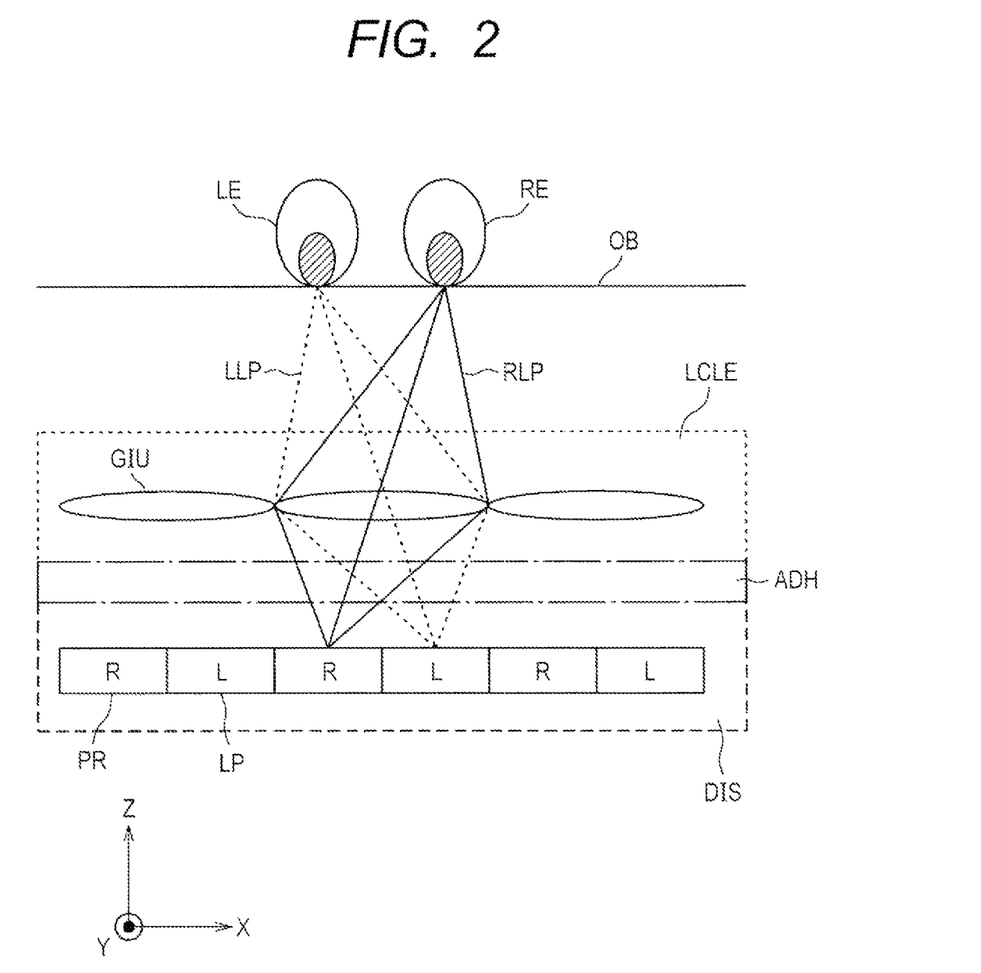
FIG. 2 is a view of the principle that a 3D image can be viewed by the display device according to the first embodiment of the present invention.

FIG. 2 shows the optical path through which the polarized light passes when the driving voltage is applied to the liquid crystal lens LCLE. In FIG. 2, the liquid crystal display panel DIS, the adhesion layer ADH, and the liquid crystal lens LCLE are stacked in the Z-axis direction, on which a viewing screen OB is provided to view the display device according to the first embodiment. Further, the left eye LE and right eye RE of the observer are shown in the viewing screen OB. The 3D image can be observed in such a way that the image for the left eye is viewed by the left eye LE and the image for the right eye is viewed by the right eye RE, respectively.

The images for the left eye and for the right eye are different from each other, which are those with parallax. The liquid crystal display panel DIS includes a pixel LP that displays the image for the left eye, and a pixel RP that displays the image for the right eye. As shown in FIG. 2, the pixel LP displaying the image for the left eye and the pixel RP displaying the image for the right eye are paired and aligned in the X-axis direction. The light from the pixel LP displaying the image for the left eye, as well as the light from the pixel RP displaying the image for the right eye both pass through the adhesion layer ADH and reach the liquid crystal lens LCLE.

The liquid crystal lens LCLE has the refractive index distribution. The refractive index distribution has a periodicity in the X-axis direction. Here, the refractive index distribution for one pitch is denoted by GIU. The refractive index distribution for one-pitch GIU focuses the light coming from the pixel LP displaying the image for the left eye, as well as the light coming from the pixel RP displaying the image for the right eye. Because of the refractive index distribution for one-pitch GIU, the observer can view the 3D display when the optical path LLP through which the light of the image for the left eye passes reaches the left eye LE, and when the optical path RLP through which the light of the image for the right eye passes reaches the right eye RE, respectively.

Configuration of the Liquid Crystal Lens

Figure 3A:
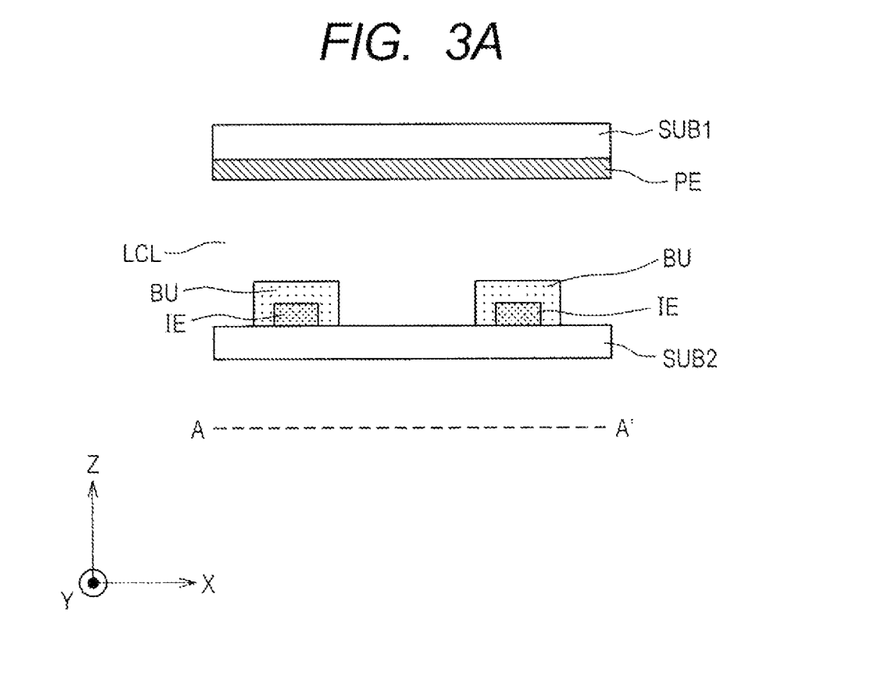
FIGS. 3A and 3B are schematic cross-sectional views of the configuration of a liquid crystal lens constituting the display device according to the first embodiment of the present invention.
Figure 3B:
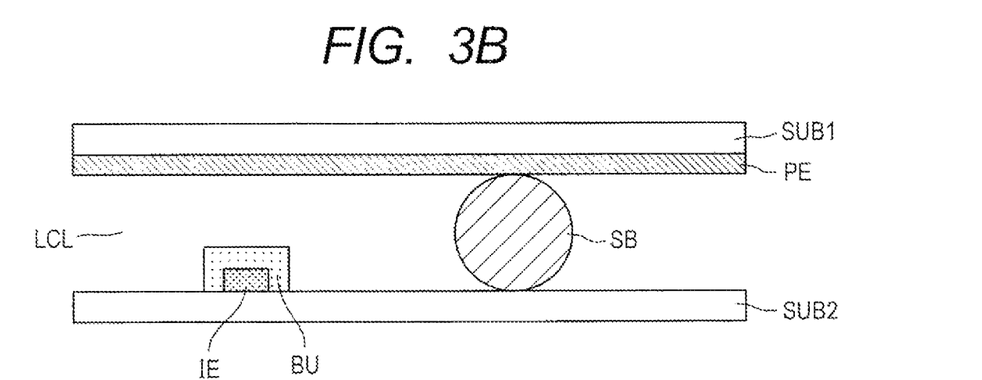

FIGS. 3A, 3B, and 3C show the cross-sectional structure of the liquid crystal lens LCLE. FIG. 3A shows the cross-sectional structure of the liquid crystal lens LCLE in which the bead SB, which is a spacer, is omitted. A planar electrode PE is provided on an upper transparent substrate SUB1. A strip-like electrode IE is provided on a lower transparent substrate SUB2. Then, a bump BU is provided on the strip-like electrode IE. There are a plurality of strip-like electrodes IE extending in the Y-axis direction and periodically aligned in the X-axis direction. A liquid crystal layer LCL is provided between the upper transparent substrate SUB1 and the lower transparent substrate SUB2.

The dashed line AA' in FIG. 2 shows that FIG. 3A is the cross section for one cycle of the strip-like electrodes IE that are aligned periodically. For example, a material such as glass is used for the upper transparent substrate SUB1 and for the lower transparent substrate SUB2. The planar electrode PE and the strip-like electrode IE are well-known transparent electrodes. Indium tin oxide (ITO) and zinc oxide (ZnO) are used as the material for the planar electrode PE and the strip-like electrode IE. The material of the bump is, for example, a resin such as an acrylic resin and an epoxy resin.

Further, for example when the material of the bump BU has light-blocking features like those of carbon-based resin, the bump has a function of blocking out unwanted scattered light. The liquid crystal layer LCL includes an oriented film, a liquid crystal material, and a bead SB as a spacer. Here, the oriented film is used to allow the liquid crystal orientation to be oriented in the horizontal direction with respect to the upper transparent substrate SUB1 and the lower transparent substrate SUB2. Further, the liquid crystal material is also p-type liquid crystal.

The material of the bead SB is glass or plastic. The outline of the method for forming the liquid crystal lens LCLE is as follows. First, the upper transparent substrate SUB1 and the lower transparent substrate SUB2 are washed. Then, the material of the planar electrode PE and the strip-like electrode IE are sputtered on each of the substrates. Next, the material of the strip-like electrode IE is etched and patterned. In this way, the planar electrode PE and the strip-like electrode IE are formed. Then, the material of the bump BU is applied and cured on the upper side of the strip-like electrode IE to form the bump BU. The oriented film is formed in the upper transparent substrate SUB1 and the lower transparent substrate SUB2, respectively. Next, the beads SB are spread on one of the two transparent substrates. Next, the two transparent substrates are bonded together by using a sealing material. Finally, the gap between the two transparent substrates is filled and sealed with the liquid crystal material. FIG. 3B shows the cross-sectional structure of the bead SB and the liquid crystal lens LCLE. The bead SB is spread on the transparent substrate, so that the position where the bead SB is provided in the liquid crystal layer LCL is not fixed.

Figure 4:
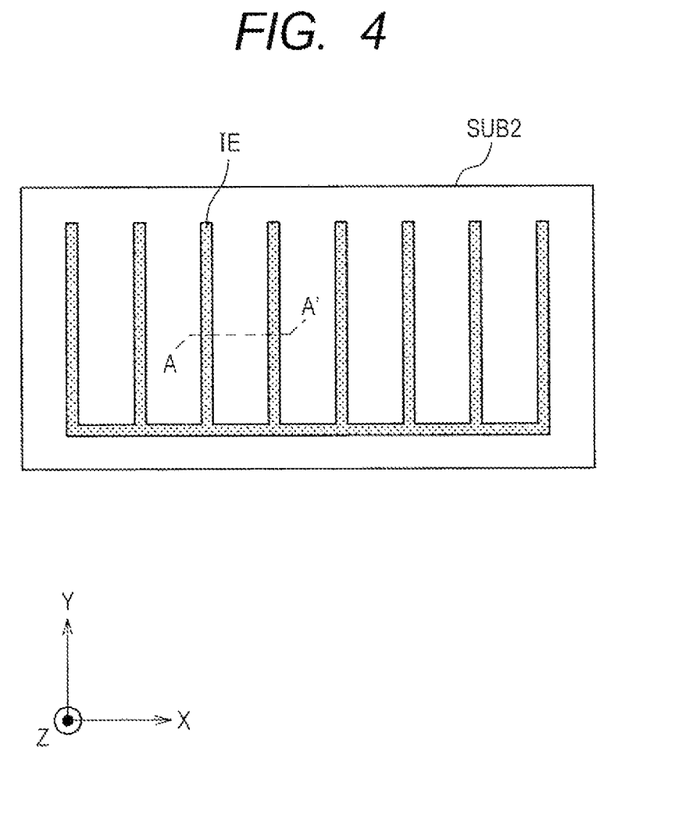
FIG. 4 is a plan view of strip-like electrodes within the liquid crystal lens constituting the display device according to the first embodiment of the present invention.

FIG. 4 shows the planar structure of the strip-like electrodes IE within the liquid crystal lens LCLE. As shown in FIG. 4, the strip-like electrodes IE for one cycle, which are shown by the dashed line AA' in FIG. 3A, are aligned in the X-axis direction. The strip-like electrode IE includes a terminal for connecting a line to apply the driving voltage from the outside. In general, the terminal is provided in the end portion of the lower transparent substrate SUB2 and the like. However, the terminal is not shown in FIG. 4.

Figure 5A:
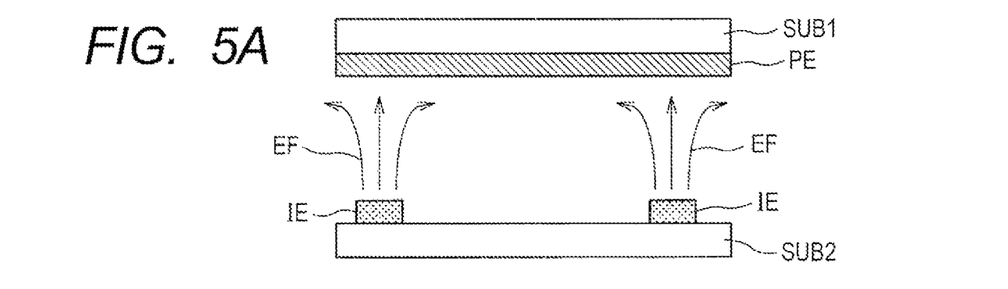
FIGS. 5A, 5B, and 5C are cross-sectional views of the electric field distribution and the liquid crystal orientation when the liquid crystal lens is driven in the display device according to the present invention.
Figure 5B:
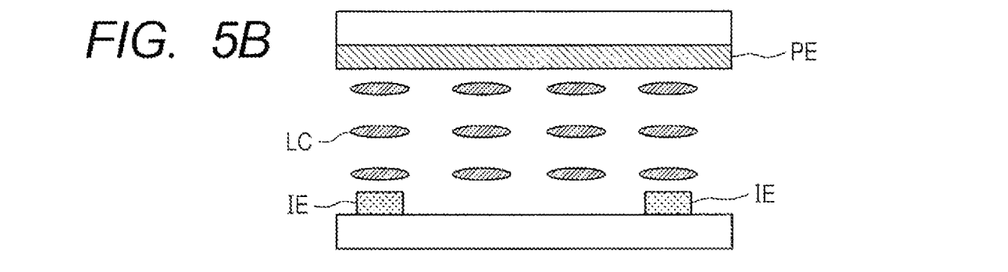
Figure 5C:
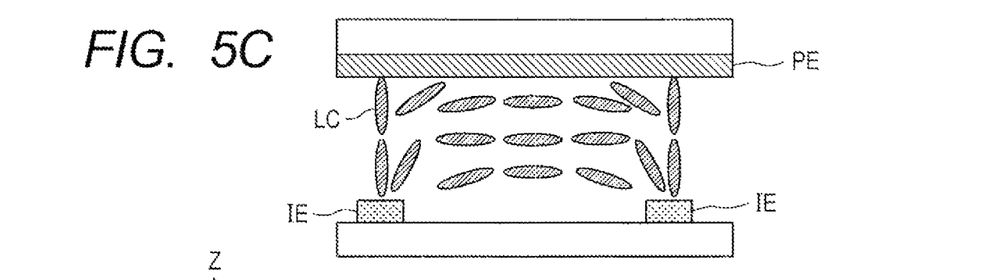

FIGS. 5A, 5B, and 5C show the electric field distribution and the liquid crystal orientation distribution when the liquid crystal lens LCLE is driven. FIG. 5A shows the electric field distribution when the liquid crystal lens LCLE is driven. When the liquid crystal lens LCLE is driven, an electric field EF is generated between the strip-like electrode IE and the planar electrode PE. As shown in FIG. 5A, the electric field EF is distributed in a radial pattern from the strip-like electrode IE. The following shows how the liquid crystal orientation is changed by the electric field EF. FIG. 5B shows the liquid crystal orientation when the liquid crystal lens LCLE is not driven. At this time, the liquid crystal orientation LC is uniformly oriented substantially parallel to the X-axis direction. FIG. 5C shows the liquid crystal orientation when the liquid crystal lens LCLE is driven. The liquid crystal orientation LC is oriented as shown in FIG. 5C by the influence of the electric field EF shown in FIG. 5A.

Figure 6:
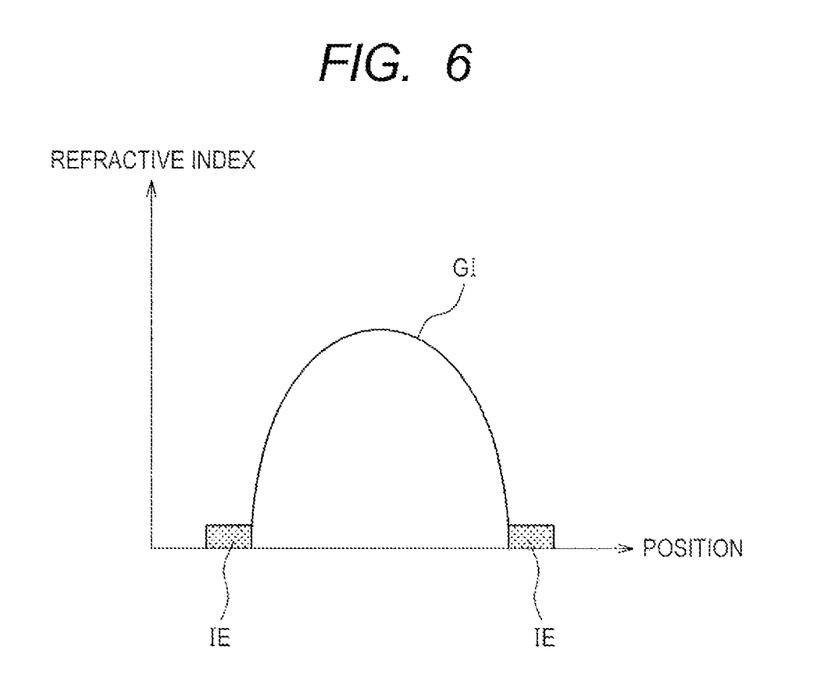
FIG. 6 is a view of the refractive index distribution that occurs when the liquid crystal lens is driven in the display device according to the present invention.

FIG. 6 shows the refractive index distribution GI that occurs when the liquid crystal lens LCLE is driven. The refractive index distribution GI is obtained by averaging the refractive indices of the polarized light vibrating in the X-axis direction in FIG. 5, which is influenced by the orientations of the liquid crystal LC, respectively, in the Z-axis direction of the x-coordinate. The liquid crystal lens LCLE is a gradient index (GRIN) lens and has the refractive index distribution.

When the polarized light vibrating in the X-axis direction is emitted to the liquid crystal orientation shown in FIG. 5C, the polarized light is influenced by the refractive index distribution GI shown in FIG. 6. The details of the refractive index distribution GI are determined by the liquid crystal orientation LC. The liquid crystal orientation of the upper part of the strip-like electrode IE is oriented in a substantially perpendicular direction to the lower transparent substrate SUB2. When the liquid crystal orientation is in this state, the polarized light vibrating in the X-axis direction is influenced by the refractive index with respect to the ordinary light of the liquid crystal material.

Further, the liquid crystal orientation between the strip-like electrodes IE is oriented in a substantially parallel direction to the lower transparent substrate SUB2. When the liquid crystal orientation is in this state, the polarized light vibrating in the X-axis direction is influenced by the refractive index with respect to the extraordinary light of the liquid crystal material. The refractive index by which the polarized light vibrating in the X-axis direction is influenced is a value between the refractive index of the ordinary light and the refractive index of the extraordinary light. For this reason, the refractive index distribution GI shown in FIG. 6 is closely related to the distribution of the liquid crystal orientation LC shown in FIG. 5C.

Further, when the refractive index distribution GI is a quadratic curve, the light focusing capability of the liquid crystal lens LCLE is the highest. The light focusing capability of the liquid crystal lens LCLE has an influence on the image quality as 3D display in this embodiment. Thus, it is preferable that the refractive index distribution GI is a quadratic curve. In other words, in order to improve the image quality as 3D display in this embodiment, the distribution of the liquid crystal orientation LC should be appropriately adjusted so that the refractive index distribution GI is a quadratic curve.

Figure 7A:
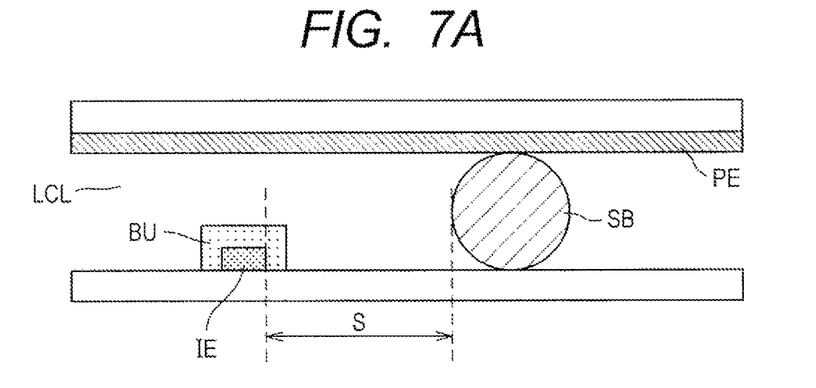
FIGS. 7A and 7B are views of the relationship between the crosstalk and the distance between the strip-like electrode and the bead.
Figure 7B:
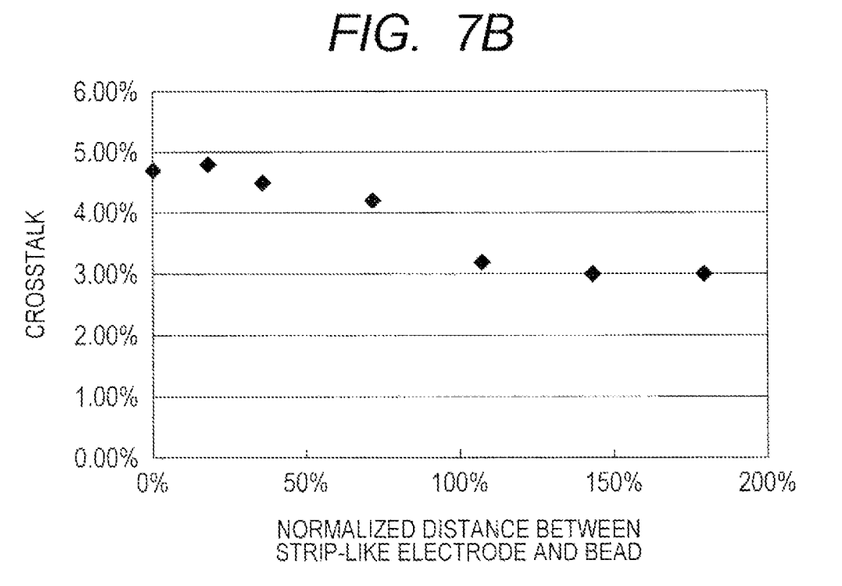

If the shape of the refractive index distribution GI of the liquid crystal lens LCLE is different from the ideal quadratic curve, the performance of the 3D display is degraded. One of the causes of this is that the distribution of the electric field EF is disturbed when the bead SB is present in the upper part of the strip-like electrode IE. FIGS. 7A, 7B, and 7C show the relationship between the crosstalk and the distance between the bead SB and the strip-like electrode.

FIG. 7A shows the distance between the bead SB and the strip-like electrode. As shown by the arrow S in FIG. 7A, the distance between the bead SB and the strip-like electrode is obtained by measuring the distance from the end of the strip-like electrode to the surface of the bead SB. Then, the obtained distance is normalized by using the diameter of the bead SB. The crosstalk is a parameter indicating how much unwanted light is generated in the 3D display. When the crosstalk increases, the three-dimensional appearance of the 3D display is reduced. As shown in FIG. 7B, the shorter the normalized distance between the bead SB and the strip-like electrode, the greater the crosstalk. This shows that the liquid crystal orientation is disturbed as described above, because the bead SB is present on the upper part of the strip-like electrode or in the vicinity of the strip-like electrode, resulting in the increase in the crosstalk.

In order to prevent this, as shown in FIG. 3B, the bump BU is provided in the upper part of the strip-like electrode IE. Even if the bead SB is provided in the upper part of the strip-like electrode IE in the course of the production process, the bead SB is pushed out of the upper part of the strip-like electrode IE due to the presence of the bump BU when the upper glass substrate SUB1 and the lower glass substrate SUB2 are bonded together. It is possible to have the effect of pushing the bead SB out of the upper part of the strip-like electrode IE by only forming the bump BU, regardless of the shape and size of the bump BU. However, if the height of the bump BU is not sufficient, the bead SB is compressed and still remains in the upper part of the strip-like electrode IE. The present invention can prevent such a phenomenon by setting the aspect ratio (vertical/horizontal) of the bump BU to 0.26 or more.

In the 3D display according to this embodiment, the height of the bump BU should be high enough to allow the bead SB to be surely put out of the upper part of the strip-like electrode IE. In order to achieve this, the height of the bump BU is increased so as to give the deformation by which the bead SB is broken. In general, the material of the bead SB used as the spacer is polymer. Thus, the deformation was measured when a polymer bead SB is broken.

Figure 8:
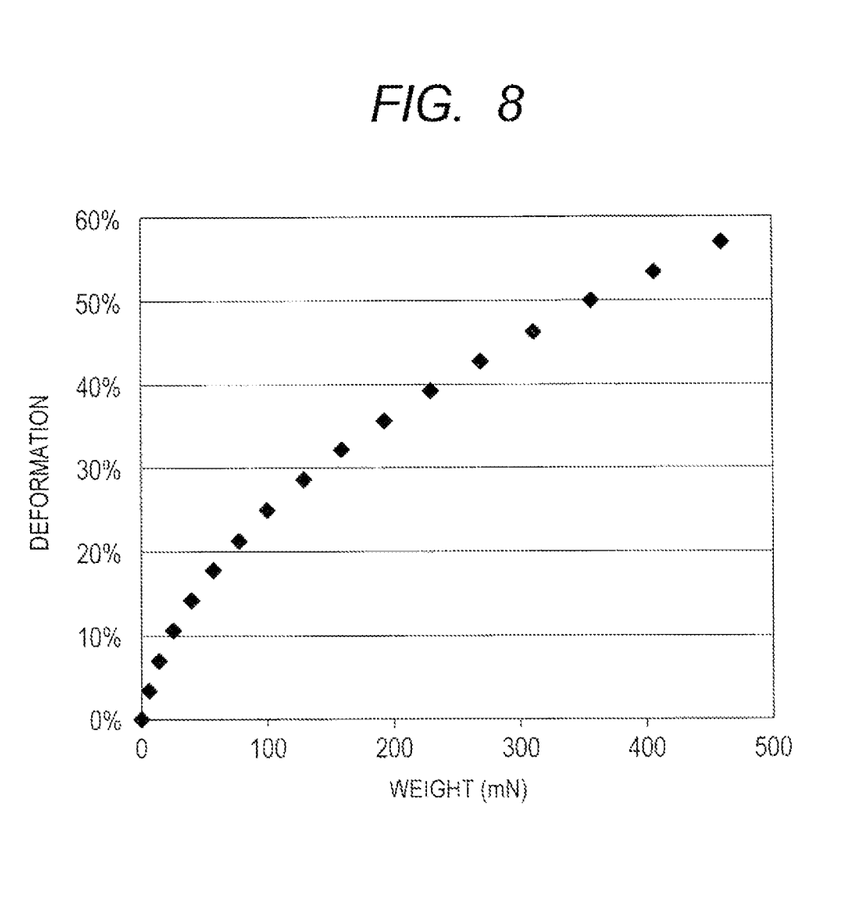
FIG. 8 is a view of the relationship between the weight given to the bead and the deformation.

FIG. 8 shows the measurement result of the deformation when a weight is given to the bead SB. As shown in FIG. 8, the increase in the deformation tends to be gradually reduced as the weight applied to the bead SB increases. Further, the bead SB is broken when the weight of 490 mN is applied. The displacement at this time is extrapolated based on the data shown in FIG. 8. In this way, it is calculated that the deformation by which the polymer bead SB is broken is 60%.

Figure 9:
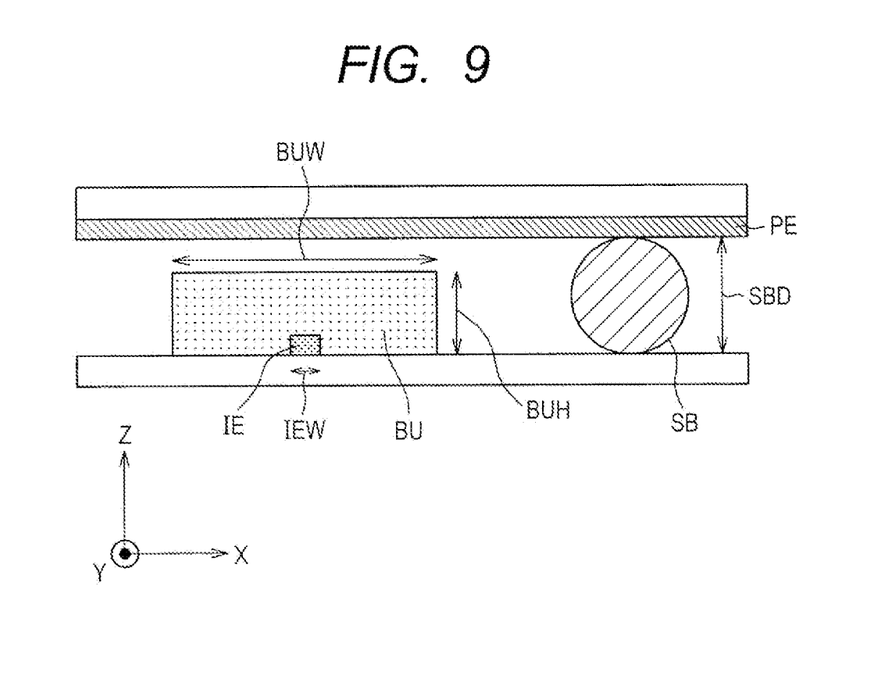
FIG. 9 is a cross-sectional view showing the display device according to the first embodiment of the present invention.

By using the deformation obtained by the above calculation when the bead SB is broken, the aspect ratio required for the bump BU is obtained. FIG. 9 shows the bump BU, the strip-like electrode IE, and the bead SB. From the calculation result, it would be preferable that the height of the bump BU is about 60% or more of the diameter SBD of the bead SB. Thus, Equation 1 is given.

[Equation 1]

$$BUH \geq SBD \times 0.6 \qquad \text{Equation 1}$$

Further, the upper limit of the height BUH of the bump BU is SBD. The bump width BUW can be obtained as follows. The bump BU should cover the strip-like electrode IE, so that the bump width BUW is dependent on the strip-like electrode width IEW. Further, the shape of the refractive index distribution GI should be a quadratic curve, so that the strip-like electrode width IEW is dependent on the diameter SBD of the bead SB.

Figure 10:
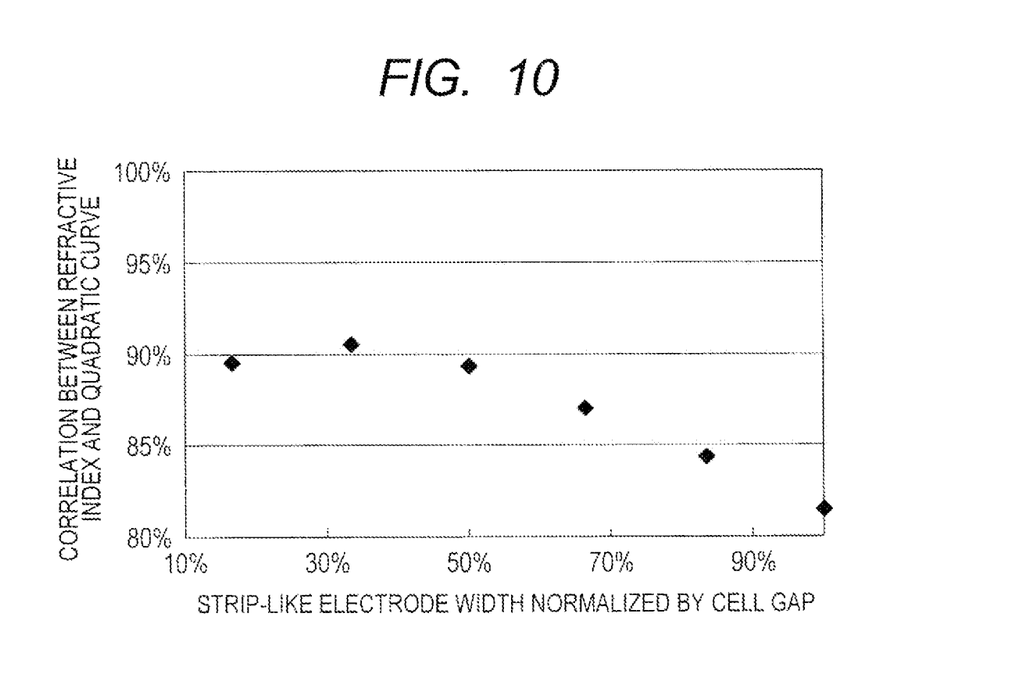
FIG. 10 is a view of the relationship between the correlation between the refractive index distribution and the quadratic curve, and the distance between strip-like electrodes that is normalized by the cell gap.

FIG. 10 shows the relationship between the correlation between the refractive index distribution and the quadratic curve, and the strip-like electrode width IEW normalized by the cell gap (SBD). The closer the correlation between the refractive index distribution and the quadratic curve to 100%, the closer the shape of the refractive index distribution to the quadratic curve, so that the higher the light focusing capability. As shown in FIG. 10, the correlation between the refractive index distribution and the quadratic curve is the highest when the strip-like electrode width IEW normalized by the cell gap is 30%. Further, the correlation between the refractive index distribution and the quadratic curve is about 90% when the strip-like electrode width IEW normalized by the cell gap is in the range from 15% to 50%. However, when the strip-like electrode width IEW normalized by the cell gap is greater than 50%, the correlation between the refractive index distribution and the quadratic curve is significantly reduced.

From the reasons described above, the strip-like electrode width IEW should be 30% of the cell gap. Thus, Equation 2 can be given.

[Equation 2]

$$IEW = SBD \times 0.3 \qquad \text{Equation 2}$$

Further, as shown in FIG. 7B, in order to completely avoid the influence of the disturbance of the electric field by the bead SB, it is necessary to prevent the bead SB from being present not only in the upper part of the strip-like electrode IE but also in the vicinity of the strip-like electrode IE. For this reason, the bump width BUW is increased by the diameter SBD of the bead SB from each of the left and right ends of the strip-like electrode IE, in addition to by the strip-like electrode width IEW. This can be expressed by Equation 3.

[Equation 3]

$$BUW = IEW + SBD \times 2 \qquad \text{Equation 3}$$

Finally, the aspect ratio, BUH/BUW, which is required for the bump BU, can be expressed by Equation 4 using the relationship of Equation 1, Equation 2, and Equation 3.

[Equation 4]

$$BUH/BUW \geq SBD \times 0.6/(IEW+SBD \times 2)$$

$$BUH/BUW \geq SBD \times 0.6/(SBD \times 0.3+SBD \times 2)$$

$$BUH/BUW \geq SBD \times 0.6/SBD \times 2.3$$

$$BUH/BUW \geq 0.26 \qquad \text{Equation 4}$$

As described above, the aspect ratio required for the bump BU is 0.26 or more. Further, from the constraint on the process, the upper limit of the aspect ratio is 1.0. Thus, the aspect ratio of the bump BU, BUH/BUW, can be expressed by Equation 5, including the conditions shown in Equation 4.

[Equation 5]

$$1.00 \geq BUH/BUW \geq 0.26 \qquad \text{Equation 5}$$

At this time, the height of the strip-like electrode IE is sufficiently smaller than the diameter SBD of the bead SB, and thus is ignored in the calculation. Further, in FIGS. 3 and 9, the bump BU is formed on the lower transparent substrate SUB2 and covers the strip-like electrode IE. However, the bump BU may be formed on the upper transparent substrate SUB1 as long as it is present in the upper part of the strip-like electrode IE. In addition, in FIGS. 3 and 9, the cross-sectional shape of the bump BU is a rectangle, but may also be a square. In this case, the length of the top and bottom sides of the bump BU may be different like a trapezoid. In addition, depending on the process of forming the bump BU, the end of the bump BU may be slightly rounded. This case is also included in the cross-sectional shape.

Second Embodiment

Figure 11A:
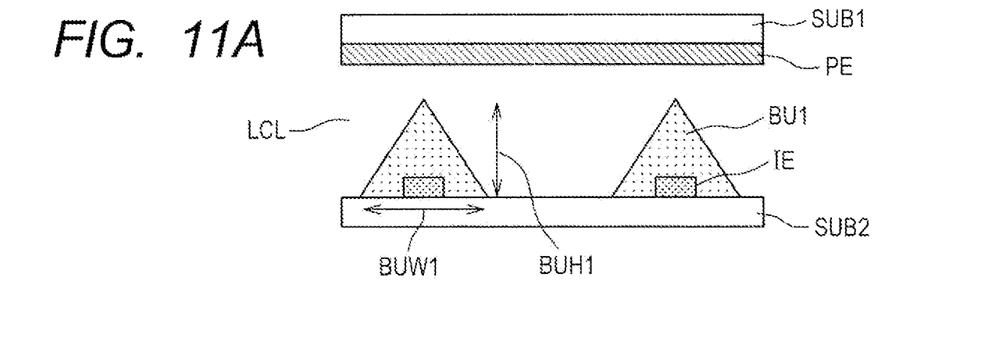
FIGS. 11A, 11B, and 11C are cross-sectional views of a display device according to a second embodiment of the present invention.
Figure 11B:
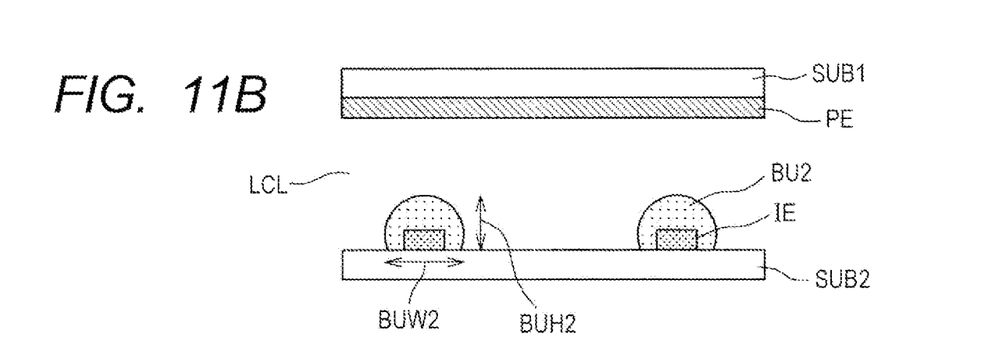
Figure 11C:
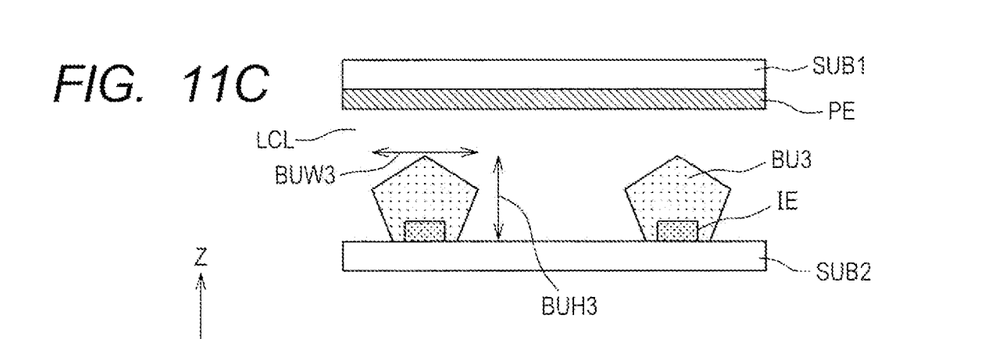

The general configuration of a second embodiment is the same as that of the first embodiment, except for the bump formed within the liquid crystal lens LCLE. FIGS. 11A, 11B, and 11C show the cross section of a liquid crystal lens LCLE according to the second embodiment. In the second embodiment, the shape of the bump BU according to the first embodiment is modified. As shown in FIGS. 11A, 11B, and 11C, according to the second embodiment, the cross-sectional shape of a bump BU1 is a tapered shape.

The rectangular bump BU shown in the first embodiment allows the bead SB to be moved away from the upper part or the vicinity of the strip-like electrode IE. However, such a rectangular bump BU may break the bead SB when the transparent substrates are bonded together. As a result, the number of beads SB available to keep the cell gap of the liquid crystal layer LCL is reduced. Or, pieces of the broken bead SB act as impurities that have harmful effect on the liquid crystal layer LCL.

On the other hand, the bump with the cross-sectional shape according to the second embodiment can facilitate the movement of the bead SB, having the effect of preventing the bead SB from being broken. In order to provide the effect of this embodiment, the shape of the bump is not limited to the triangular, semicircular, and pentagonal shapes shown in FIG. 11A, 11B, and 11C, respectively, as long as it is tapered. In other words, the angle of a plurality of sides in the cross-sectional shape of the bump is convex with respect to the upper transparent substrate.

The bumps with these shapes are formed as follows. The strip-like electrode IE is formed on the lower transparent substrate SUB2. Then, the material of the bump BU described in the first embodiment is applied and cured on the strip-like electrode IE. The various shapes shown in FIGS. 11A to 11C can be formed by controlling the speed of the application. The aspect ratio required for these bumps are the same as the aspect ratio in the first embodiment. The aspect ratio of the bump BU according to the second embodiment is the ratio of the height of the bump to the largest width of the cross section of the bump. In the examples shown in FIGS. 11A, 11B, and 11C, the ratio of BUH1 to BUW2, the ratio of BUH2 to BUW2, and the ratio of BUH3 to BUW3 are the aspect ratios of the individual bumps, respectively. In order to provide the effect of the second embodiment, the aspect ratio of the individual bumps is preferably 0.26 or more.

Third Embodiment

Figure 12:
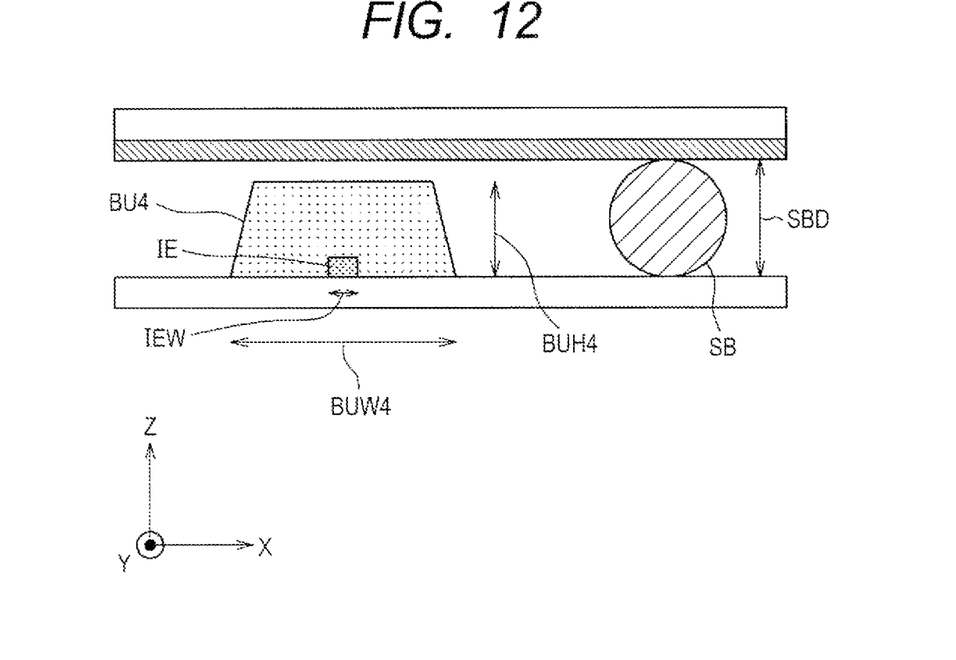
FIG. 12 is a cross-sectional view of a display device according to a third embodiment of the present invention.

The general configuration of a third embodiment is the same as that of the first embodiment, except for the bump BU formed within the liquid crystal lens LCLE. FIG. 12 is a cross-sectional view of a liquid crystal lens LCLE according to the third embodiment. A height BUH4 of a bump BU4 in the third embodiment is higher than the case of the first embodiment. With this configuration, it is possible to increase the pressure resistance when an external pressure is applied to the liquid crystal lens LCLE in the actual environment, in addition to the effect of moving the bead SB away from the upper part or the vicinity of the strip-like electrode IE.

Figure 13:
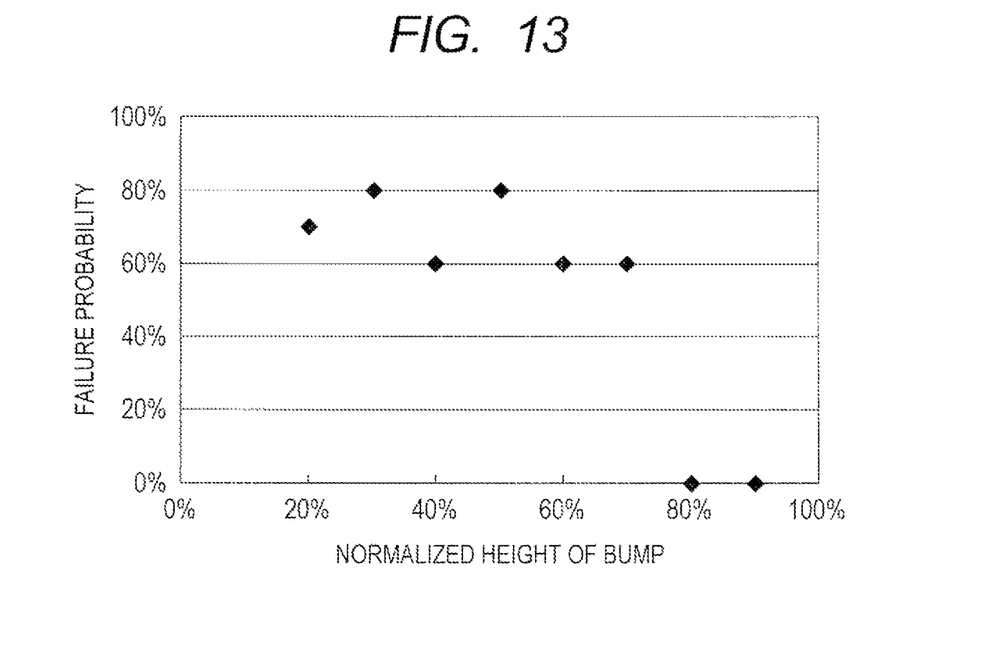
FIG. 13 is a view showing the relationship between the height of a bump and the failure probability.

FIG. 13 shows the results of the pressure test. The pressure test is a test to find the probability that the bead SB, which is the spacer, is broken when an impact is applied to the liquid crystal lens LCLE. The height of the bump is normalized by the cell gap (SBD). The failure probability is calculated from the number of times the bead SB is broken when an impact is applied to the liquid crystal lens LCLE ten times.

As shown in FIG. 13, the failure probability decreases when the normalized bump height is 80% or more. The result shows that the cell gap is instantaneously reduced by 20% or more due to the impact applied to the liquid crystal lens LCLE, and that at this time, the bead SB is broken by the pressure. Thus, it can be considered that when the height of the bump is 80% or more of the cell gap, the reduction in the cell gap is suppressed by the bump, so that the failure probability decreases. For this reason, the height of the bump BU4 should be 80% or more of the bead SB in order to increase the pressure resistance of the liquid crystal lens LCLE. This is given by Equation 6.

[Equation 6]

$$BUH4 \geq SBD \times 0.8 \qquad \text{Equation 6}$$

The width BUW4 of the bump BU4 is the same as that in the first embodiment, and the value is given by Equations 1 and 2. Thus, the aspect ratio of the bump BU4 according to the third embodiment is expressed by Equation 7.

[Equation 7]

$$BUH4/BUW4 \geq SBD \times 0.8/(IEW+SBD \times 2)$$

$$BUH4/BUW4 \geq SBD \times 0.8/(SBD \times 0.3+SBD \times 2)$$

$$BUH4/BUW4 \geq SBD \times 0.8/(SBD \times 2.3)$$

$$BUH4/BUW4 \geq 0.35 \qquad \text{Equation 7}$$

As described above, the aspect ratio required for the bump BU is about 0.35 or more. At this time, similarly to the first embodiment, the bump BU with the aspect ratio of 1.00 or more may not be formed due to the constraint on the process. Thus, the aspect ratio of the bump BU4, BUH4/BUW4, according to the third embodiment can also be given by Equation 8.

[Equation 8]

$$1.00 \geq BUH4/BUW4 \geq 0.35 \qquad \text{Equation 8}$$

The method of forming the bump BU4 and the material thereof are the same as those in the first and second embodiments.

The present invention made by the present inventors has been described in detail based on the embodiments. However, the present invention is not limited to the exemplary embodiments, and various modifications can be made within the scope of the present invention.

What is claimed is:

1. A display device comprising a display panel and a liquid crystal lens provided on the display panel,
    wherein the liquid crystal lens includes a first transparent substrate and a second transparent substrate with liquid crystal in between,
    wherein the distance between the first and second transparent substrates is provided by a bead,
    wherein the first transparent substrate includes a planer electrode,
    wherein the second transparent substrate includes strip-like electrodes extending in a first direction and aligned in a second direction orthogonal to the first direction,
    wherein the strip-like electrode is covered by a bump extending in the first direction,
    wherein the display device provides a three-dimensional display by applying a voltage between the planar electrode and the strip-like electrode, and
    wherein the display device provides a two-dimensional display by not applying a voltage between the planar electrode and the strip-like electrode.

2. The display device according to claim 1,
    wherein the ratio between the vertical diameter and the transverse diameter in the cross section in the second direction of the bump is 0.26 or more and 1.0 or less,
    wherein the vertical diameter is the highest diameter of the cross section, and
    wherein the transverse diameter is the widest diameter of the cross section.

3. The display device according to claim 2, wherein the ratio between the vertical diameter and the transverse diameter in the bump is 0.35 or more and 1.0 or less.

4. The display device according to claim 2, wherein the angle of a plurality of sides facing the first substrate in the cross-sectional shape of the bump is convex with respect to the first substrate.

5. The display device according to claim 2, wherein the side facing the first substrate in the cross-sectional shape of the bump is parallel to the first substrate.

6. The display device according to claim 2, wherein the cross-sectional shape of the bump is a rectangle.

7. The display device according to claim 2, wherein the cross-sectional shape of the bump is an oval.

8. The display device according to claim 1, wherein the width in the second direction of the strip-like electrode is 0.15 to 0.5 times the thickness of the liquid crystal layer.

9. The display device according to claim 1, wherein the height in the second direction of the bump is 0.6 to 1.0 times the thickness of the liquid crystal layer.

10. A display device comprising a display panel and a liquid crystal lens provided on the display panel,
    wherein the liquid crystal lens includes a first transparent substrate and a second transparent substrate with liquid crystal in between,
    wherein the distance between the first and second transparent substrate is provided by a bead,
    wherein the first transparent substrate includes a planer electrode,
    wherein the second transparent substrate includes strip-like electrodes extending in a first direction and aligned in a second direction orthogonal to the first direction,
    wherein the strip-like electrode is covered by a bump extending in the first direction, and
    wherein the bump is formed so that the distance between the bead and the strip-like electrode is greater than the thickness of the liquid crystal layer.

11. The display device according to claim 1, wherein the dielectric anisotropy of a liquid crystal material used for the liquid crystal layer is positive.

12. The display device according to claim 10, wherein the dielectric anisotropy of a liquid crystal material used for the liquid crystal layer is positive.

13. The display device according to claim 1, wherein the bump is formed by a resin.

14. The display device according to claim 10, wherein the bump is formed by a resin.

15. The display device according to claim 1, wherein the display panel is a liquid crystal display panel.

16. The display device according to claim 10, wherein the display panel is a liquid crystal display panel.

* * * * *